(12) United States Patent
Evans

(10) Patent No.: US 9,967,356 B2
(45) Date of Patent: *May 8, 2018

(54) BULK UPLOADING OF MULTIPLE SELF-REFERENCING OBJECTS

(71) Applicant: International Business Machines Corporation, Armonk, NY (US)

(72) Inventor: Thomas A. Evans, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/098,358

(22) Filed: Apr. 14, 2016

(65) Prior Publication Data
US 2016/0226949 A1 Aug. 4, 2016

Related U.S. Application Data

(63) Continuation of application No. 14/184,753, filed on Feb. 20, 2014, now Pat. No. 9,398,068.

(51) Int. Cl.
*G06F 15/16* (2006.01)
*H04L 29/08* (2006.01)
*H04L 12/911* (2013.01)
*H04L 29/06* (2006.01)

(52) U.S. Cl.
CPC .......... *H04L 67/2804* (2013.01); *H04L 47/72* (2013.01); *H04L 67/02* (2013.01); *H04L 67/2833* (2013.01); *H04L 67/42* (2013.01)

(58) Field of Classification Search
CPC ..... H04L 47/72; H04L 67/02; H04L 67/2804; H04L 67/2833; H04L 67/42
USPC ........................................ 709/203, 232, 238
See application file for complete search history.

(56) References Cited

U.S. PATENT DOCUMENTS

| 6,266,673 | B1 | 7/2001 | Hong et al. |
| 8,054,906 | B2 | 11/2011 | Choi et al. |
| 9,398,068 | B2 | 7/2016 | Evans |
| 9,444,761 | B2 | 9/2016 | Evans |
| 2011/0270855 | A1 | 11/2011 | Antonysamy |
| 2013/0103842 | A1 | 4/2013 | Seed et al. |
| 2013/0117238 | A1 | 5/2013 | Gower |

(Continued)

OTHER PUBLICATIONS

U.S. Appl. No. 15/152,666, Entitled "Bulk Uploading of Multiple Self-Referencing Objects", filed Jun. 15, 2016.

(Continued)

*Primary Examiner* — Phuoc Nguyen
(74) *Attorney, Agent, or Firm* — John W. Hayes; Brian M. Restauro

(57) ABSTRACT

A computer implemented method, computer program product, and system for performing create, read, update, or delete operations on a plurality of resources in a client-server environment. In an embodiment, the computer implemented method includes the steps of identifying individual resources requiring operations to be performed, assigning local references for any resources to which a URI (Uniform Resource Identifier) has not been provided by the server, generating metadata describing the local references and operations to be performed, wrapping each individual resource with the metadata to provide a plurality of wrapped resources arranging the wrapped resources into a single payload, and transmitting the single payload to the server.

20 Claims, 5 Drawing Sheets

(56) References Cited

U.S. PATENT DOCUMENTS

| | | |
|---|---|---|
| 2013/0250959 A1 | 9/2013 | Van Wyk |
| 2014/0143339 A1* | 5/2014 | Huang .................... H04L 67/16 |
| | | 709/204 |
| 2015/0089560 A1 | 3/2015 | Park et al. |
| 2015/0237165 A1 | 8/2015 | Evans |
| 2016/0149827 A1 | 5/2016 | Evans |
| 2016/0277521 A1 | 9/2016 | Evans |

OTHER PUBLICATIONS

U.S. Appl. No. 15/009,007, Entitled "Bulk Uploading of Multiple Self-Referencing Objects", filed Jan. 28, 2016.

"IBM Integration Bus V9.0 Delivers Key Enhancements to Enable Intelligent Processing and Operational Management Within an Integration Solution," IBM United States Software Announcement 213-133, dated Apr. 23, 2013.

"What's new in Version 9.0?" IBM Integration Bus Version 9.0.0.0 Product Overview, Copyright IBM Corporation 1999, 2013. Last updated Jul. 1, 2013 09:14:26.

Evans, Thomas; "Bulk Uploading of Multiple Self-Referencing Objects"; U.S. Appl. No. 15/413,460, filed Jan. 24, 2017, pp. 1-32.

\* cited by examiner

302

| 304 ~ | local:resourceA |
| 306 ~ | http://myhost/resourceA |
| 308 ~ | <pointer to referenced resource> |
| 310 ~ | local:resourceB |
| 312 ~ | http://myhost/resourceB |
| 314 ~ | <pointer to referenced resource> |
| 316 ~ | local:resourceC |
| 318 ~ | http://myhost/resourceC |
| 320 ~ | <pointer to referenced resource> |
| 322 ~ | <metadata> |

BULK UPLOADING OF MULTIPLE SELF-REFERENCING OBJECTS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): "IBM Integration Bus V9.0 Delivers Key Enhancements to Enable Intelligent Processing and Operational Management Within an Integration Solution," IBM United States Software Announcement 213-133, dated Apr. 23, 2013.

FIELD OF THE INVENTION

The present invention relates generally to communication among interacting software applications and in particular to minimizing the number of individual REST requests associated with related resources.

BACKGROUND OF THE INVENTION

Development of new and better software applications has proliferated in recent years, largely because of the growth of large-scale computing, computer networks, and increasing interest in the "cloud." The term "cloud computing" generally characterizes a computing environment where a substantial number of computers are interconnected over a large data network, such as the Internet. This is an ideal environment for network-based services, and many business entities take advantage of this arrangement to avail themselves of "software as a service," or SaaS, in which software applications and data are hosted by a remotely-located computer (or group of computers) accessible over the Internet.

This approach permits subscribers to the service to use a "thin client" at their local site that depends heavily on a fully provisioned server, connected to the client through the Internet, in what is known as a "client-server" relationship. The client-server model is a popular configuration for networked computing in which the remotely-located computer, or server, is designed to share software and data with a local client that simply needs to establish contact with the server to use its software and data resources.

Client-server is a relatively simple arrangement that enables a local computer to take advantage of remotely available resources. One of the hurdles that must be cleared in distributed computing environments, however, is the fact that many desirable software applications were originally written for use with specific operating systems and may not be easily transported (or "ported") to a different operating system or to a host computer that uses a different processor. Data formats may also be unique to particular applications, and consequently incompatible with others. Thus, behind the scenes of distributed computing, there is an ongoing effort to overcome compatibility issues through application integration. In enterprise environments, achieving operational harmony among disparate applications and data formats is often accomplished through "middleware."

In simple terms, middleware is computer software that resides between the operating system for a particular platform and application software providing desirable functionality. Middleware's primary purposes are facilitating communication and input/output (I/O) operations among applications. Since the above-cited incompatibilities among disparate applications and data structures are also regularly encountered outside the enterprise setting, even in client-server operations, enabling proper communication and I/O is a task toward which a great deal of development work has been directed.

REST, or Representational State Transfer, is an architectural style that is considered the underpinning of the World Wide Web. Because of this relationship with the way in which the web operates, REST is frequently employed in distributed computing applications, particularly when web services are involved. In fact, client-server is one of the formal REST interaction constraints applied to resources (components, connectors, and data elements). Another constraint that characterizes systems that follow REST architectural principles is statelessness. In other words, no information associated with a client context can be stored on the server between requests. After all, a network of web pages is nothing but a virtual state machine. A user navigates his way through a web application by a sequence of link selections, where each link selection invokes a state transition. Content from the page to which the hyperlink points is then presented to the user.

SUMMARY

Embodiments of the present invention disclose a computer implemented method, computer program product, and system for performing create, read, update, or delete operations on a plurality of resources in a client-server environment. In one embodiment, in accordance with the present invention, the computer implemented method includes the steps of identifying individual resources requiring operations to be performed; assigning local references for any resources to which a URI (Uniform Resource Identifier) has not been provided by the server; generating metadata describing the local references and operations to be performed; wrapping each individual resource with the metadata to provide a plurality of wrapped resources; arranging the wrapped resources into a single payload; and transmitting the single payload to the server.

BRIEF DESCRIPTION OF THE SEVERAL VIEWS OF THE DRAWINGS

FIG. 3 illustrates a portion of a memory map in accordance with an embodiment of the present invention.

DETAILED DESCRIPTION

A desired aspect in the uploading of self-referencing objects is the ability to perform CRUD operations (Create, Read, Update, Delete) via REST on resource graphs (a form of directed graph that includes relationships among resources) within a single transaction. However, since a given resource is not generally able to be referenced until it is created, one is faced with a seemingly insurmountable difficulty from the outset. A current approach to solving this problem is to use multiple operations, each in its own transaction. This approach dramatically increases the cost of the network requests for each operation, and also, if one fails, it is more difficult to roll back, sometimes requiring additional complex techniques such as client-side compensation logic.

Rather than employing multiple operations, each requiring its own transaction, embodiments in accordance with the present invention generate a single payload along with additional metadata dictating the relationships between the graph resources and the operations needing to be applied to each resource. This means that all of the operations can be accomplished as a single transaction on the server, rolling back if any of the individual operations fails. With more of the work being done server side, not client side, the cost of the network requests does not increase, since a single request with a larger payload is being created.

In an embodiment, a single REST request is generated including multiple CRUD operations, along with metadata indicating relationships between graph resources and the operations to be applied to each graph resource. Resources that require modification are collected in the client domain. For references that do not yet exist, local references are provided. Each individual resource is wrapped with metadata that describes the operations and local references, and this payload is transmitted to the server. The server receives the payload and creates a transaction.

Figure 1:
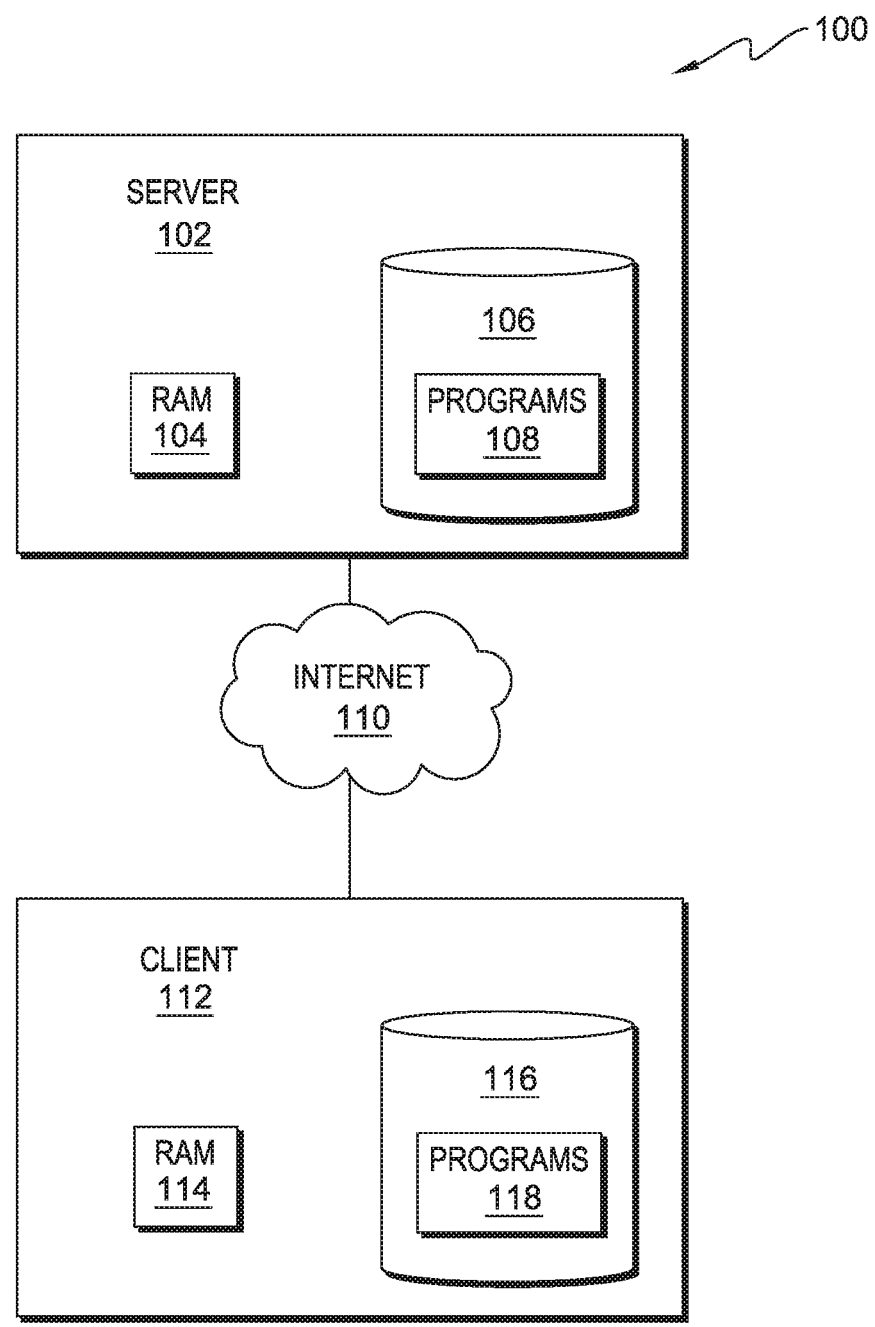
FIG. 1 is a block diagram depicting a client-server configuration in accordance with an embodiment of the present invention.

The present invention will now be described in detail with reference to the Figures. FIG. 1 is a block diagram, generally depicted by the numeral 100, illustrating a client-server configuration in accordance with an embodiment of the present invention. A server computer (or server) 102 includes RAM 104 and persistent storage 106, which may be coupled to the server 102 through a bus structure. Persistent storage 106 may, for example, be a hard disk drive. Programs 108 that are stored in persistent storage 106 include operating system software as well as software that enables the server 102 to communicate with, and provide desirable services to, other computers over a data connection. Although the server 102 may communicate primarily with one or more clients 112, the server 102 may also communicate with other servers.

In FIG. 1, the Internet 110 is shown as the interconnecting fabric between client 112 and server 102. In practice, the connection may be any viable data transport network, such as, for example, a LAN or WAN. In any case, the client 112 must be able to communicate effectively with the server 102. The client 112 also has RAM 114 and persistent storage 116, such as a hard disk drive, which may be coupled to the client 112 via a bus, for example. The persistent storage 116 holds programs 118 that may require interaction with the server 102. The persistent storage 116 may also hold data elements or data structures with which programs 118 may interact.

Figure 2:
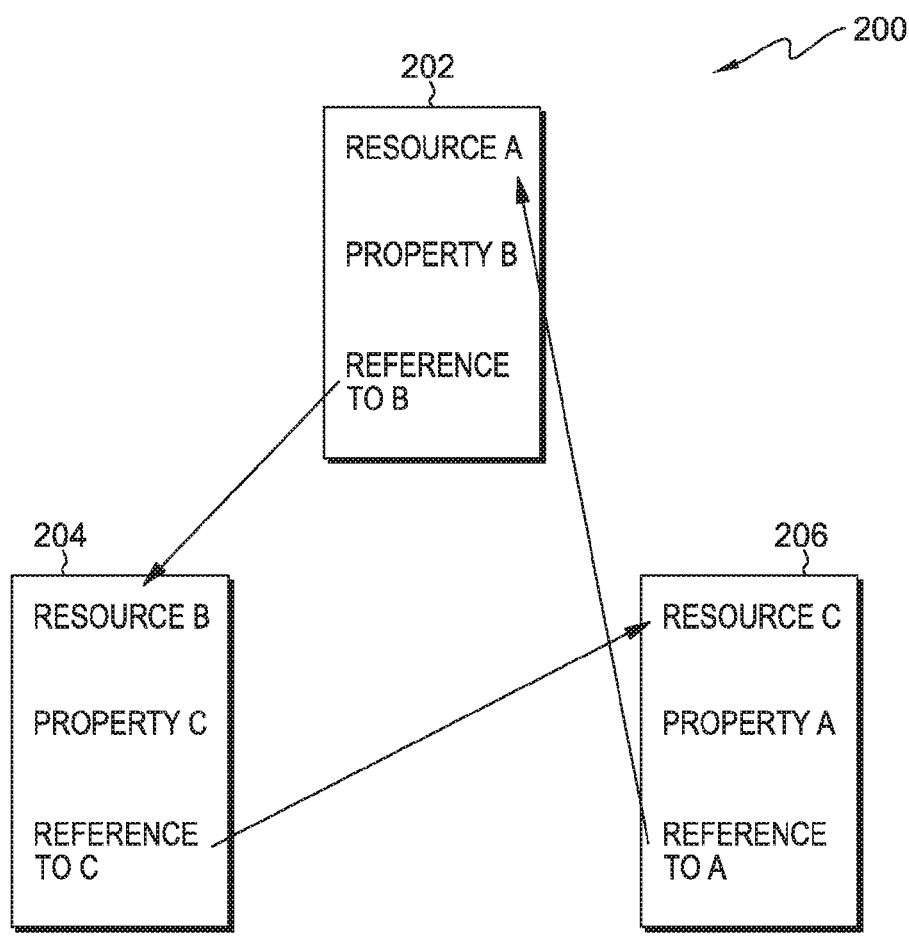
FIG. 2 is a symbolic representation of a plurality of resources in accordance with an embodiment of the present invention.

FIG. 2 is a symbolic representation 200 of a plurality of resources in accordance with an embodiment of the present invention. Within a RESTful architecture (where REST refers to Representational State Transfer), the term "resource" generally contemplates a connector, component, or data element identified by an application running in the client domain that prospectively interacts with other resources. References to these resources may appear within documents, such as HTML (HyperText Markup Language) documents or XML (Extensible Markup Language) documents, for example, that reference each other. Web services also rely on other services. There may be a plurality of different services available that depend upon one another. Within the representation 200 depicted in FIG. 2, Resource A 202 has been identified as including a Property B. A property, in a programming context, generally identifies a class member that lies between a data member and a method. In this instance, Property B is known to be a reference to Resource B 204. In an embodiment, Resource B 204 includes Property C, which is identified as a reference to Resource C 206. Resource C 206 is identified as including Property A, which, in this instance, is a reference to Resource A 202.

RESTful architectures contemplate a "layered" system, in which a client cannot generally determine whether it is interacting directly with a particular server or perhaps with some interposed system or application. This architecture encourages efficiencies in the form of load-balancing, for example. Perhaps the most fundamental and useful constraint of a RESTful architecture, however, is the requirement of a uniform interface. The principal tenet of the uniform interface constraint is that individual resources be identified. This resource identification is generally accomplished using URIs (Uniform Resource Identifiers) on web-based REST systems. RESTful architectures also permit manipulation of resources through these representations. It is expected that a client holding a representation of a resource (including any attached metadata) has enough information to modify or delete the resource on the server, assuming the client has permission.

RESTful architectures are further assumed to operate under the constraint that each message includes enough information to describe how to process the message. In addition, in compliance with a constraint called "hypermedia as the engine of application state" (HATEOAS), clients make state transitions only through actions that are dynamically identified within hypermedia by the server (e.g., by hyperlinks within hypertext).

FIG. 3 illustrates a portion of a memory map, generally depicted by the reference numeral 302, in accordance with an embodiment of the present invention. As noted above, collecting resources that require modification is an operation performed in the client domain. In order to optimize this task, a graphical representation, such as a resource graph, is a useful tool. In one embodiment, a resource graph may be created using RDF (Resource Description Framework), that contemplates formulating conceptual statements regarding resources (particularly web resources) in a fashion that lends itself particularly well to extracting relationships among resources. In accordance with other embodiments, the relationships among resources may be discovered by middleware in the client domain.

As noted above, a RESTful client generally retrieves, creates, updates and deletes resources through HTTP methods (GET, POST, PUT, DELETE). Each resource is identified by a URI. Each resource supports one or more of the HTTP methods. Some resources (usually known as collections) may respond to a GET request by listing references to other resources. As noted previously, a resource can be a network data object, but a resource may also be a service identified by a URI.

Collection resources might also allow the creation of new resources through a POST request. When a new resource has been POSTed, the response includes the URI of the new resource. The client may then use that URI to retrieve (GET), update (PUT) or delete (DELETE) that resource. RDF resources typically contain relationships to other resources, which are identified by their URIs. So, using basic REST, to create two resources where one refers to the others, the client would need to perform multiple operations:

1. POST the first resource, making note of the resulting URI;

2. POST the second resource, making note of the resulting URI;

3. GET the first resource via its URI (the resource may not be exactly the same as what was originally POSTed); and 4. PUT an updated version of the first resource, which now may include the second resource's URI.

No matter how the resources are identified, or how their interrelationships are discovered, these data items may find themselves stored in memory within a memory map similar to memory map 302. The memory map 302 may be used to collect resources and their relationships, as well as resource identifications provided in the client domain and URIs returned by the server. For example, memory location 304 is utilized to store the local representation of Resource A (202 in FIG. 2). Once the server generates a URI for Resource A, that information may be included in the memory map 302 in location 306, as the URI http://myhost/resourceA, for example. In addition, the memory map 302 may include a pointer 308 to referenced resources that memorializes known relationships. In this example, it is already known that Resource A 202 includes a reference to Resource B 204.

In similar fashion, locally generated identifications for Resources B and C may appear in the memory map 302 in locations 310 and 316, respectively. URIs returned from the server for Resources B and C may appear in the memory map 302 in locations 312 and 318, respectively, and pointers to referenced resources for Resources B and C may appear in the memory map 302 in locations 314 and 320, respectively. These pointers to referenced resources increase the utility of the memory map 302 by allowing portions of the map to function as a linked list. Finally, metadata associated with the relationships among Resources A, B, and C may be stored in the memory map 302 in location 322. As mentioned above, in order to accomplish bulk uploading in accordance with embodiments of the present invention, each individual resource is wrapped with metadata that describes the operations and local references, and this payload is transmitted to the server. Although the Resource Description Framework (RDF) has been discussed briefly in a previous section, embodiments in accordance with the present invention should not be considered restricted to RDF resources. There are a variety of RDF representations, but the memory map of FIG. 3 approximates an N-Triples representation, which will be discussed in more detail in a subsequent section. Strictly speaking, HTTP is simply a protocol that defines some standard methods which may be useful in implementing a RESTful service. Other transports, protocols, and methods may also be employed. In an embodiment, HTTP is used as the remote client-server protocol, but this is not intended to be limiting.

As noted above, the use of RDF is not a requirement and should not be considered as limiting the present invention in any way. Even where RDF is utilized, there are a number of different representations. Some are XML-based (XML/RDF), some are JSON-based (JSON-LD, or JavaScript Object Notation for Linked Data) and some (including N-Triples) are SPARQL-based (a recursive acronym that stands for SPARQL Protocol and RDF Query Language). As mentioned, HTML may also be used. The metadata employed in the examples herein is simply expressed as additional data included in the main body of a request. Therefore, metadata is in the same format as the remainder of the content. The concept of wrapping each individual resource with metadata simply means that metadata is packaged or included in the same request transmission as the resource or resources with which particular metadata groups are concerned. Such a transmission may be a request to create resources on the server, to modify resources, or to perform other operations on the resources.

For the specific example introduced above, collection of resources calls attention to the fact that Resources A, B, and C reference one another. However, in this RESTful architecture, one cannot reference a resource that has not yet been created. It is considered particularly RESTful to take full advantage of HTTP methods. As discussed previously, it is desirable to perform Create, Read, Update, and Delete operations via REST on resource graphs within a single transaction. Create is analogous to the HTTP POST operation; Read is analogous to GET in HTTP; Update is equivalent to a PUT in HTTP, and Delete may be accomplished by an HTTP DELETE operation.

A POST operation is used to transmit a representation of a new data entity to the server, so that it will be stored as a new subordinate of the resource identified by the URI. GET in HTTP requests a representation of the specified resource. It is well understood that, ordinarily, a GET in HTTP should only retrieve data and have no other effect. PUT requests that the enclosed entity be stored under the URI that is provided in the request. In a PUT, if the URI already has a corresponding resource, it is modified. In the event that the URI does not yet have a corresponding resource, then the server creates the resource with that URI. DELETE has the effect that one would expect; the specified resource is deleted.

The three resources, Resource A, Resource B, and Resource C, collected and identified in the client domain as local:resourceA, local:resourceB, and local:resourceC, are "wrapped" (coupled with associated metadata identifying their relationships) and POSTed to the server in one request. The server creates the resources and then updates the references between them. After this creation process, the resources now have the correct server-assigned URIs. Specifically, Resource A is now identified by the URI http://myhost/resourceA, Resource B becomes http://myhost/resourceB, and Resource C is http://myhost/resourceC. Their reference properties now also use those server-assigned URIs. As discussed previously in conjunction with FIG. 2, Property B is encountered in Resource A as a reference to Resource B 204. So Property B is identified as http://myhost/resourceB. Similarly, Property C=http://myhost/resourceC, and Property A=http://myhost/resourceA.

An example request to POST three new resources A, B and C is set forth below in RDF. As a person of ordinary skill will readily apprehend, RDF describes relationships among resources using N-Triples, or statements having a subject, a predicate, and an object. RDF may model such statements by a resource graph in which the subject and object are represented as nodes, while the predicate is represented as an arc that connects the two nodes. This type of representation is closely related to the memory map of FIG. 3, which suggests one way in which resources and their interrelationships may be stored in memory for easy retrieval. That is, resources and their interrelationships may be retrieved by traversing (systematically searching) the resource graph implicit in the memory map to identify individual resources requiring operations to be performed. During this operation, resources that do not have server-assigned URIs are readily detected, for example. It can also be readily determined from the resource graph which resources reference other resources that have yet to be created. In addition, it is worthwhile to note that it is often useful to employ blank nodes as a way to represent aggregate concepts and to impart structure to make a set of N-Triples both easier to construct and easier to read. Blank node identifiers are distinguished by an underscore character followed by a colon (_:).

In the example set forth below, Resource A has a reference to Resource B, Resource B has a reference to Resource C and Resource C has a reference to Resource A. The main body of the request contains three operations, denoted by statements (2), (3), and (4).

```
_:request <http://www.w3.org/1999/02/22-rdf-syntax-ns#type>
  <http://www.ibm.com/ns/request#Request>.              (1)
_:request <http://www.ibm.com/ns/request#operation>     (2)
  _:operationA.
_:request <http://www.ibm.com/ns/request#operation>     (3)
  _:operationB.
_:request <http://www.ibm.com/ns/request#operation>     (4)
  _:operationC.
```

The operation resource to be wrapped around Resource A is set forth as follows:

```
_:operationA <http://www.w3.org/1999/02/22-rdf-syntax-ns#type>
  <http://www.ibm.com/ns/request#Operation>.            (5)
_:operationA <http://www.ibm.com/ns/request#localURI>
  <local:resourceA>,                                    (6)
``` where "localURI" is the temporary URI that can be used to refer to the resource before it is created.
_:operationA  <http://www.ibm.com/ns/request#resource> _:resourceA, (7)
where "resource" is a reference to the new Resource A.
_:operationA  <http://www.ibm.com/ns/request#operation> <http://www.ibm.com/ns/request#POST>, (8)
where "operation" refers to the operation that will be performed (in this case POST, but other operations are allowed).
_:operationA  <http://www.ibm.com/ns/request#creation> <http://myhost/creation>, (9)
where "creation" here is the URI of the creation root (where the resource should be POSTed to).
_:operationA  <http://www.ibm.com/ns/request#metadata> _:metadataA, (10)
where the metadata in expression (10) is a reference to a set of dynamic metadata that will be used when processing the operation.

The operation resource to be wrapped around Resource B is set forth below. Just as explained above with regard to Resource A, a POST operation will be performed at the designated creation root with an associated set of dynamic metadata:

```
_:operationB <http://www.w3.org/1999/02/22-rdf-syntax-ns#type>
  <http://www.ibm.com/ns/request#Operation>.            (11)
_:operationB <http://www.ibm.com/ns/request#localURI>
  <local:resourceB>.                                    (12)
_:operationB <http://www.ibm.com/ns/request#resource>   (13)
  _:resourceB.
_:operationB <http://www.ibm.com/ns/request#operation>
  <http://www.ibm.com/ns/request#POST>.                 (14)
_:operationB <http://www.ibm.com/ns/request#creation>
  <http://myhost/creation>.                             (15)
_:operationB <http://www.ibm.com/ns/request#metadata>   (16)
  _:metadataB.
```

Finally, just as explained above with regard to Resource A and Resource B, Resource C will also be POSTed at the designated creation root with its own associated set of dynamic metadata.

```
_:operationC <http://www.w3.org/1999/02/22-rdf-syntax-ns#type>
  <http://www.ibm.com/ns/request#Operation>.            (17)
_:operationC <http://www.ibm.com/ns/request#localURI>
  <local:resourceC>.                                    (18)
_:operationC <http://www.ibm.com/ns/request#resource>   (19)
  _:resourceC.
_:operationC <http://www.ibm.com/ns/request#operation>
  <http://www.ibm.com/ns/request#POST>.                 (20)
_:operationC <http://www.ibm.com/ns/request#creation>
  <http://myhost/creation>.                             (21)
_:operationC <http://www.ibm.com/ns/request#metadata>   (22)
  _:metadataC.
```

The following is Resource A itself:

```
_:resourceA <http://www.w3.org/1999/02/22-rdf-syntax-ns#type>
  <http://www.ibm.com/ns/request#TestType>.             (23)
_:resourceA <http://purl.org/dc/terms/title> "Resource A". (24)
```

Here, in expression (24), "title" is an example of a simple property that would not be dynamically updated by the server.

```
_:resourceA <http://www.ibm.com/ns/request#referenceToB>
  <local:resourceB>.                                    (25)
```

As noted previously, Resource A has a property called "referenceToB" which, at the moment, is referred to by its temporary local URI, "local:resourceB".

```
_:resourceB <http://www.w3.org/1999/02/22-rdf-syntax-ns#type>
  <http://www.ibm.com/ns/request#TestType>.             (26)
_:resourceB <http://purl.org/dc/terms/title> "Resource B". (27)
_:resourceB <http://www.ibm.com/ns/request#referenceToC>
  <local:resourceC>.                                    (28)
```

Also as noted above, for purposes of this example, Resource B has a property called "referenceToC" and Resource C has a property called "referenceToA".

```
_:resourceC <http://www.w3.org/1999/02/22-rdf-syntax-ns#type>
  <http://www.ibm.com/ns/request#TestType>.             (29)
_:resourceC <http://purl.org/dc/terms/title> "Resource C". (30)
_:resourceC <http://www.ibm.com/ns/request#referenceToA>
  <local:resourceA>.                                    (31)
```

Following is a metadata resource for the Resource A operation:

```
_:metadataA <http://www.w3.org/1999/02/22-rdf-syntax-ns#type>
  <http://www.ibm.com/ns/request#Metadata>.             (32)
_:metadataA <http://www.ibm.com/ns/request#property>
  <http://www.ibm.com/ns/request#referenceToB>,         (33)
``` where the property "referenceToB" in expression (33) is a reference to the property within Resource A which should be dynamically updated by the server.

```
_:metadataA <http://www.ibm.com/ns/request#localURI>
  <local:resourceB>,                                    (34)
``` where "localURI" is the current local value that should be replaced with a server-assigned (or real) URI of Resource B once it has been created.

Similarly, the following are metadata resources for the Resource B and Resource C operations:

```
_:metadataB <http://www.w3.org/1999/02/22-rdf-syntax-ns#type>
<http://www.ibm.com/ns/request#Metadata>.                              (35)
_:metadataB <http://www.ibm.com/ns/request#property>
<http://www.ibm.com/ns/request#referenceToC>.                          (36)
_:metadataB <http://www.ibm.com/ns/request#localURI>
<local:resourceC>.                                                      (37)
_:metadataC <http://www.w3.org/1999/02/22-rdf-syntax-ns#type>
<http://www.ibm.com/ns/request#Metadata>.                              (38)
_:metadataC <http://www.ibm.com/ns/request#property>
<http://www.ibm.com/ns/request#referenceToA>.                          (39)
_:metadataC <http://www.ibm.com/ns/request#localURI>
<local:resourceA>.                                                      (40)
```

The following is an example response from the server to the client request, returning the created resources:

```
_:response
 <http://www.w3.org/1999/02/22-rdf-syntax-ns#type>
 <http://www.ibm.com/ns/request#Response>.                             (41)
_:response <http://www.ibm.com/ns/request#operation>                   (42)
_:operationA.
_:response <http://www.ibm.com/ns/request#operation>                   (43)
_:operationB.
_:response <http://www.ibm.com/ns/request#operation>                   (44)
_:operationC.
```

Three operations were performed, so there are three operation responses:

```
_:operationA <http://www.w3.org/1999/02/22-rdf-syntax-ns#type>
<http://www.ibm.com/ns/request#Operation>.                             (45)
_:operationA <http://www.ibm.com/ns/request#localURI>
<local:resourceA>,                                                      (46)
``` where "localURI" is the temporary local URI that was originally given in the request.

```
_:operationA <http://www.ibm.com/ns/request#resource>
 <http://myhost/creation/resourceA>,                                   (47)
``` where "resource" represents the newly created resource. It should be noted that this time it has a "real" (server-assigned) URI.

```
_:operationA <http://www.ibm.com/ns/request#operation>
 <http://www.ibm.com/ns/request#POST>,                                 (48)
``` where "operation" is the operation that was performed.

```
_:operationB <http://www.w3.org/1999/02/22-rdf-syntax-ns#type>
<http://www.ibm.com/ns/request#Operation>.                             (49)
_:operationB <http://www.ibm.com/ns/request#localURI>
<local:resourceB>.                                                      (50)
_:operationB <http://www.ibm.com/ns/request#resource>
<http://myhost/creation/resourceB>.                                     (51)
_:operationB <http://www.ibm.com/ns/request#operation>
<http://www.ibm.com/ns/request#POST>.                                   (52)
_:operationC <http://www.w3.org/1999/02/22-rdf-syntax-ns#type>
<http://www.ibm.com/ns/request#Operation>.                             (53)
_:operationC <http://www.ibm.com/ns/request#localURI>
<local:resourceC>.                                                      (54)
_:operationC <http://www.ibm.com/ns/request#resource>
<http://myhost/creation/resourceC>.                                     (55)
```

```
_:operationC <http://www.ibm.com/ns/request#operation>
<http://www.ibm.com/ns/request#POST>.                                   (56)
```

Following is the newly-created Resource A, using its server-assigned URI:

```
<http://myhost/creation/resourceA>
<http://www.w3.org/1999/02/22-rdf-
syntax-ns#type> <http://www.ibm.com/ns/request#TestType>.              (57)
<http://myhost/creation/resourceA> <http://purl.org/dc/terms/title>
"Resource A",                                                           (58)
``` where the "title" has not changed compared to the requested value.

```
<http://myhost/creation/resourceA>
<http://www.ibm.com/ns/request#referenceToB>
<http://myhost/creation/resourceB>,                                     (59)
``` where the value of the reference property "referenceToB" is now the server-assigned URI of Resource B.

```
<http://myhost/creation/resourceB>
<http://www.w3.org/1999/02/22-rdf-
syntax-ns#type> <http://www.ibm.com/ns/request#TestType>.              (60)
<http://myhost/creation/resourceB> <http://purl.org/dc/terms/title>
"Resource B".                                                           (61)
<http://myhost/creation/resourceB>
<http://www.ibm.com/ns/request#referenceToC>
<http://myhost/creation/resourceC>.                                     (62)
<http://myhost/creation/resourceC> <http://www.w3.org/1999/02/22-rdf-
syntax-ns#type> <http://www.ibm.com/ns/request#TestType>.              (63)
<http://myhost/creation/resourceC> <http://purl.org/dc/terms/title>
"Resource C".                                                           (64)
<http://myhost/creation/resourceC>
<http://www.ibm.com/ns/request#referenceToA>
<http://myhost/creation/resourceA>.                                     (65)
```

A situation may arise where it is necessary to replace one resource with another. For example, it may become necessary to replace Resource C (206 in FIG. 2) with a new resource: Resource D. To accomplish this, one must first create Resource D, then update the reference that appears in Resource B. After these steps have been carried out, Resource C should be deleted.

First, Resource D is identified in the client domain as local:resourceD. A POST operation will cause the server to generate the appropriate URI for new Resource D. Resource B (204 in FIG. 2) includes Property C, which is a reference to C. Since it is desirable to update the reference to Resource C that appears in Resource B, a PUT is the proper HTTP operation in this situation. To delete Resource C, a DELETE operation is the appropriate choice. These three operations, POST, PUT, and DELETE, are sent to the server in one request so they will be processed within a single transaction. As noted previously, if any part were to fail, roll back would occur. After completion of the transaction, Resource D=http://myhost/resourceD. Property C, which previously appeared in Resource B, is now a reference to Resource D (http://myhost/resourceD), and Resource C has been effectively deleted and replaced by Resource D.

Figure 4:
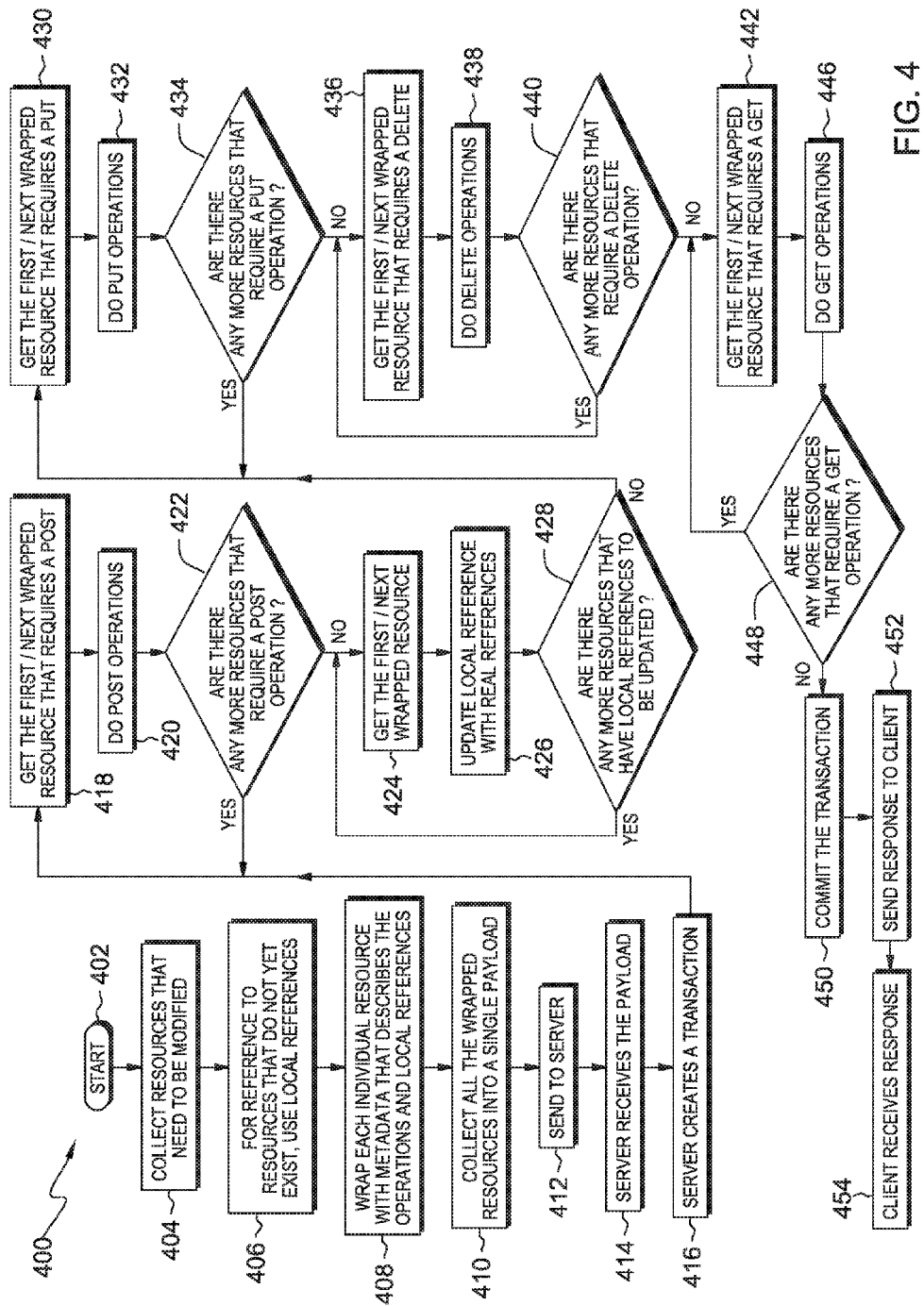
FIG. 4 is a flowchart of operations performed in uploading self-referencing objects in accordance with an embodiment of the present invention.

FIG. 4 is a flowchart, generally depicted by the numeral 400, of operations performed in uploading self-referencing objects in accordance with an embodiment of the present invention. After a START state 402, resources that require modification, or at least need server-supplied URIs, are collected in the client domain (step 404). In the next step 406, local references are generated for resources that do not yet exist.

In step 408, each individual resource is wrapped with metadata that describes the local references and associated operations. All of the wrapped resources are then collected into a single payload (step 410), and transmitted to the server in the subsequent step 412. The server receives the payload (step 414) and creates a transaction (step 416). When a server creates (or starts) a transaction, it is standard operating procedure to execute all of the operations (usually low-level persistence operations) atomically. Executing operations atomically means that if one of those operations fails, then all of the operations contained within the transaction should be rolled back, or undone.

The server retrieves the first resource requiring a POST transaction in step 418, then performs specified POST operations in the subsequent step (420). The server determines whether there are any remaining resources requiring a POST operation in step 422. If "YES," the server returns to step 418 to retrieve the next resource. If "NO," the server retrieves the next wrapped resource in step 426, and updates local references with "real references" (that is, server-assigned URIs) in the next step (426).

In the subsequent step (428), the server determines whether there are any resources remaining that have local references requiring updating. If "YES," the server returns to step 424 to retrieve the next wrapped resource. If "NO," the server proceeds to step 430 to obtain the first wrapped resource requiring a PUT operation. The server then performs the required PUT operations (step 432), then determines whether there are any more resources requiring a PUT operation (step 434). If the answer is "YES," the server returns to step 430 to acquire the next wrapped resource that requires a PUT operation. If "NO," the server proceeds to step 436 to retrieve the first wrapped resource that requires a DELETE operation.

After performing required DELETE operations (step 438), the server determines whether there are any more resources requiring a DELETE operation in the subsequent step (440). If the answer is "YES," the server returns to step 436 to acquire the next wrapped resource requiring a DELETE operation. If "NO," the server proceeds to step 442 to obtain the first wrapped resource that requires a GET operation. After performing a required GET operation in step 446, the server determines whether there are any more resources requiring a GET operation (step 448). If "YES," the server returns to step 442 to acquire the next resource requiring a GET operation. If "NO," the server commits the transaction in step 450 and transmits the response to the client in the subsequent step (452). The client then receives the response (step 454). When the server "commits" a transaction, this means that the server has finished performing operations which should be included in that transaction. Generally, changes are only made permanent and visible to other clients once the transaction has been committed.

Figure 5:
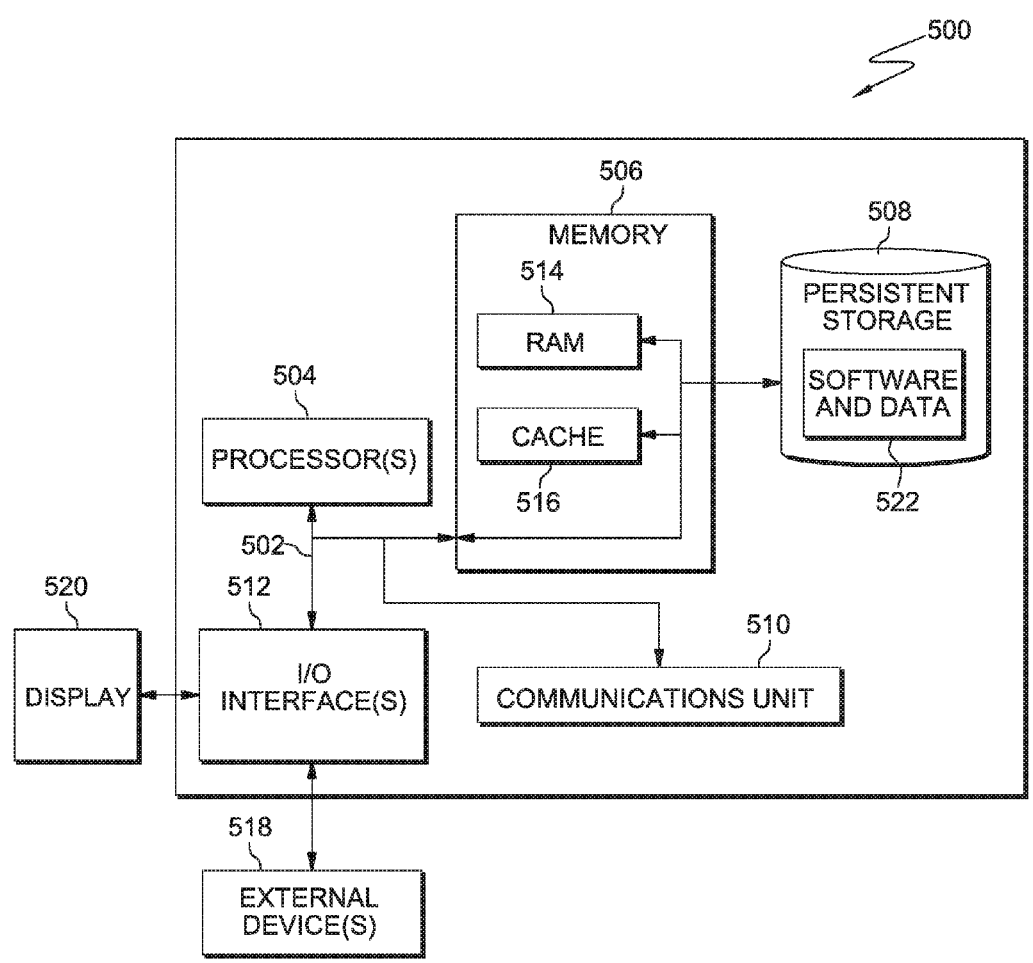
FIG. 5 is a functional block diagram of a computer system in accordance with an embodiment of the present invention.

FIG. 5 is a functional block diagram of a computer system in accordance with an embodiment of the present invention. FIG. 5 depicts computer system 500, which is representative of client computer 112 that hosts client-side programs 118, data structures, or other resources in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer-readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. RAM 514 may be used to store data such as the memory map 302 in accordance with the present invention. In general, memory 506 can include any suitable volatile or non-volatile computer-readable storage device. Software and data 522 are stored in persistent storage 508 for access and/or execution by processors 504 via one or more memories of memory 506. With respect to client computer 112, for example, software and data 522 represents client-side programs 118, possible associated data structures and resources, and any requisite disk workspace. It should be noted that processor or processors 504 may host more than one client-side application.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage devices capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other sub-systems or devices. In an embodiment, communications unit 510 may provide appropriate interfaces to the Internet 110 or other suitable data communications network to connect to one or more server computers 102. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data 522 can be stored on such portable computer-readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, carried out by one or more processors, comprising:
   identifying individual resources of a plurality of resources requiring operations to be performed in a client-server environment;
   generating metadata describing the operations to be performed and local references for any resources to which a URI (Uniform Resource Identifier) has not been provided by the server;
   wrapping each individual resource with the resource's respective metadata to provide a plurality of wrapped resources; and
   arranging the wrapped resources into a single payload.

2. The method in accordance with claim 1, wherein identifying individual resources requiring operations to be performed further comprises:
   traversing a resource graph stored in memory to identify individual resources requiring operations to be performed.

3. The method in accordance with claim 1, wherein generating metadata describing the local references in a client domain for any resources to which a URI has not been provided by the server further comprises:
   identifying a resource in the client domain by a local reference.

4. The method in accordance with claim 1, wherein generating metadata describing the operations to be performed and local references for any resources to which a URI (Uniform Resource Identifier) has not been provided by the server further comprises generating the metadata in RDF N-Triple format.

5. The method in accordance with claim 1, wherein wrapping each individual resource with the metadata to provide a plurality of wrapped resources further comprises:
   including metadata associated with each individual resource of the plurality of resources, wherein the metadata specifies relationships among resources and operations to be applied to each resource.

6. The method in accordance with claim 1, further comprising:
   transmitting the single payload to the server by:
   utilizing an HTTP (Hypertext Transfer Protocol) POST operation for creating a resources on the server;
   utilizing an HTTP GET operation for retrieving a server-assigned URI of a new resource;
   utilizing an HTTP PUT operation for updating a resource; and
   utilizing an HTTP DELETE operation for deleting a resource.

7. The method in accordance with claim 6, further comprising:
   receiving the transmitted payload at the server;
   creating a transaction to begin executing operations specified in the payload;
   extracting resources from the payload requiring a POST operation, if any, and performing specified POST operations;
   updating any local resources from the payload that require server-assigned URIs; and
   determining, in sequence, whether any resources in the payload require PUT, GET, or DELETE operations, and performing those operations, if any.

8. A computer program product comprising:
   one or more computer readable storage media and program instructions stored on the one or more computer readable storage media, the program instructions comprising:
   program instructions to identify individual resources of a plurality of resources requiring operations to be performed in a client-server environment;
   program instructions to generate metadata describing the operations to be performed and local references for any resources to which a URI (Uniform Resource Identifier) has not been provided by the server;
   program instructions to wrap each individual resource with the resource's respective metadata to provide a plurality of wrapped resources; and
   program instructions to arrange the wrapped resources into a single payload.

9. The computer program product in accordance with claim 8, wherein the program instructions to identify individual resources requiring operations to be performed further comprise:
   program instructions to traverse a resource graph stored in memory to identify individual resources requiring operations to be performed.

10. The computer program product in accordance with claim 8, wherein the program instructions to generate metadata describing the local references in a client domain for any resources to which a URI has not been provided by the server further comprise:
    program instructions to identify a resource in the client domain by a local reference.

11. The computer program product in accordance with claim 8, wherein the program instructions to generate metadata describing the operations to be performed and local references for any resources to which a URI (Uniform Resource Identifier) has not been provided by the server further comprise program instructions to generate the metadata in RDF N-Triple format.

12. The computer program product in accordance with claim 8, wherein the program instructions to wrap each individual resource with the metadata to provide a plurality of wrapped resources further comprise:
    program instructions to include metadata associated with each individual resource of the plurality of resources, wherein the metadata specifies relationships among resources and operations to be applied to each resource.

13. The computer program product in accordance with claim 8, wherein the program instructions stored on the one or more computer readable storage media further comprise:
    program instructions to transmit the single payload to the server by:
    program instructions to utilize an HTTP (Hypertext Transfer Protocol) POST operation for creating a resources on the server;
    program instructions to utilize an HTTP GET operation for retrieving a server-assigned URI of a new resource;
    program instructions to utilize an HTTP PUT operation for updating a resource; and
    program instructions to utilize an HTTP DELETE operation for deleting a resource.

14. The computer program product in accordance with claim 13, wherein the program instructions stored on the one or more computer readable storage media further comprise:

program instructions to receive the transmitted payload at the server;

program instructions to create a transaction to begin executing operations specified in the payload;

program instructions to extract resources from the payload requiring a POST operation, if any, and performing specified POST operations;

program instructions to update any local resources from the payload that require server-assigned URIs; and program instructions to determine, in sequence, whether any resources in the payload require PUT, GET, or DELETE operations, and performing those operations, if any.

15. A computer system comprising:

one or more computer processors;

one or more computer readable storage media; and program instructions stored on the one or more computer readable storage media for execution by at least one of the one or more computer processors, the program instructions comprising:

program instructions to identify individual resources of a plurality of resources requiring operations to be performed in a client-server environment;

program instructions to generate metadata describing the operations to be performed and local references for any resources to which a URI (Uniform Resource Identifier) has not been provided by the server;

program instructions to wrap each individual resource with the resource's respective metadata to provide a plurality of wrapped resources; and program instructions to arrange the wrapped resources into a single payload.

16. The computer system in accordance with claim 15, wherein the program instructions to identify individual resources requiring operations to be performed further comprise:

program instructions to traverse a resource graph stored in memory to identify individual resources requiring operations to be performed.

17. The computer system in accordance with claim 15, wherein the program instructions to generate metadata describing the local references in a client domain for any resources to which a URI has not been provided by the server further comprise:

program instructions to identify a resource in the client domain by a local reference.

18. The computer system in accordance with claim 15, wherein the program instructions to generate metadata describing the operations to be performed and local references for any resources to which a URI (Uniform Resource Identifier) has not been provided by the server further comprise program instructions to generate the metadata in RDF N-Triple format.

19. The computer system in accordance with claim 15, wherein the program instructions to wrap each individual resource with the metadata to provide a plurality of wrapped resources further comprise:

program instructions to include metadata associated with each individual resource of the plurality of resources, wherein the metadata specifies relationships among resources and operations to be applied to each resource.

20. The computer system in accordance with claim 15, wherein the program instructions stored on the one or more computer readable storage media further comprise:

program instructions to transmit the single payload to the server by:

program instructions to utilize an HTTP (Hypertext Transfer Protocol) POST operation for creating a resources on the server;

program instructions to utilize an HTTP GET operation for retrieving a server-assigned URI of a new resource;

program instructions to utilize an HTTP PUT operation for updating a resource; and program instructions to utilize an HTTP DELETE operation for deleting a resource.

* * * * *